United States Patent [19]

Wapner et al.

[11] Patent Number: 4,915,573

[45] Date of Patent: Apr. 10, 1990

[54] STAIR LIFT

[76] Inventors: Frank J. Wapner; Shirley E. Wapner, both of 2473 Wilbraham Rd., Springfield, Mass. 01129

[21] Appl. No.: 240,677

[22] Filed: Sep. 6, 1988

[51] Int. Cl.⁴ .......................... B60P 1/00

[52] U.S. Cl. .......................... 414/540; 414/921; 187/9 R

[58] Field of Search .......................... 414/540, 921; 187/9 R

[56] References Cited

U.S. PATENT DOCUMENTS

| | | | |
|---|---|---|---|
| 2,921,700 | 1/1960 | Reed, Jr. | 187/9 R X |
| 3,174,634 | 3/1965 | Peck | 414/540 X |
| 4,026,387 | 5/1977 | Abreu | 187/9 R |
| 4,071,260 | 1/1978 | Marshall, Sr. | 414/540 X |
| 4,124,097 | 11/1978 | Hawks et al. | 414/540 X |
| 4,133,437 | 1/1979 | Gates | 414/921 X |
| 4,176,999 | 12/1979 | Thorley | 414/540 |
| 4,180,366 | 12/1979 | Roth et al. | 414/921 X |
| 4,306,634 | 12/1981 | Sangster | 187/9 R |

FOREIGN PATENT DOCUMENTS

| | | | |
|---|---|---|---|
| 0132440 | 6/1986 | Japan | 414/540 |
| 2106857 | 4/1983 | United Kingdom | 414/921 |

*Primary Examiner*—Robert J. Spar

*Assistant Examiner*—James R. Bidwell

*Attorney, Agent, or Firm*—Ross, Ross & Flavin

[57] ABSTRACT

A stair lift incorporates a pair of power jacks linked to a stair or step and associated with a vehicle such as a trailer adjacent the vehicle doorway, with the jacks operating in tandem to raise or lower the stair or step with a person standing thereon.

1 Claim, 3 Drawing Sheets

STAIR LIFT

BACKGROUND OF THE INVENTION

1. Field of the Invention

The invention relates to means for automatically raising or lowering a stair or step with a person standing thereon relative to a vehicle for facilitating entry into or egress from the vehicle of the person should he be elderly or infirm.

2. Description of the Prior Art

A wide variety of devices is available for raising or lowering a vehicle stair or step while carrying a load. However, for the most part, they are complicated in their structure, unreliable in their use, or expensive in their manufacture.

SUMMARY OF THE INVENTION

The invention incorporates a pair of power jacks linked to a stair or step and associated with a vehicle such as a trailer adjacent the vehicle doorway, with the jacks operating in tandem to raise or lower the stair or step, with a person standing thereon, the structure being uncomplicated, reliable and inexpensive.

DESCRIPTION OF THE PREFERRED EMBODIMENTS

Figure 1:
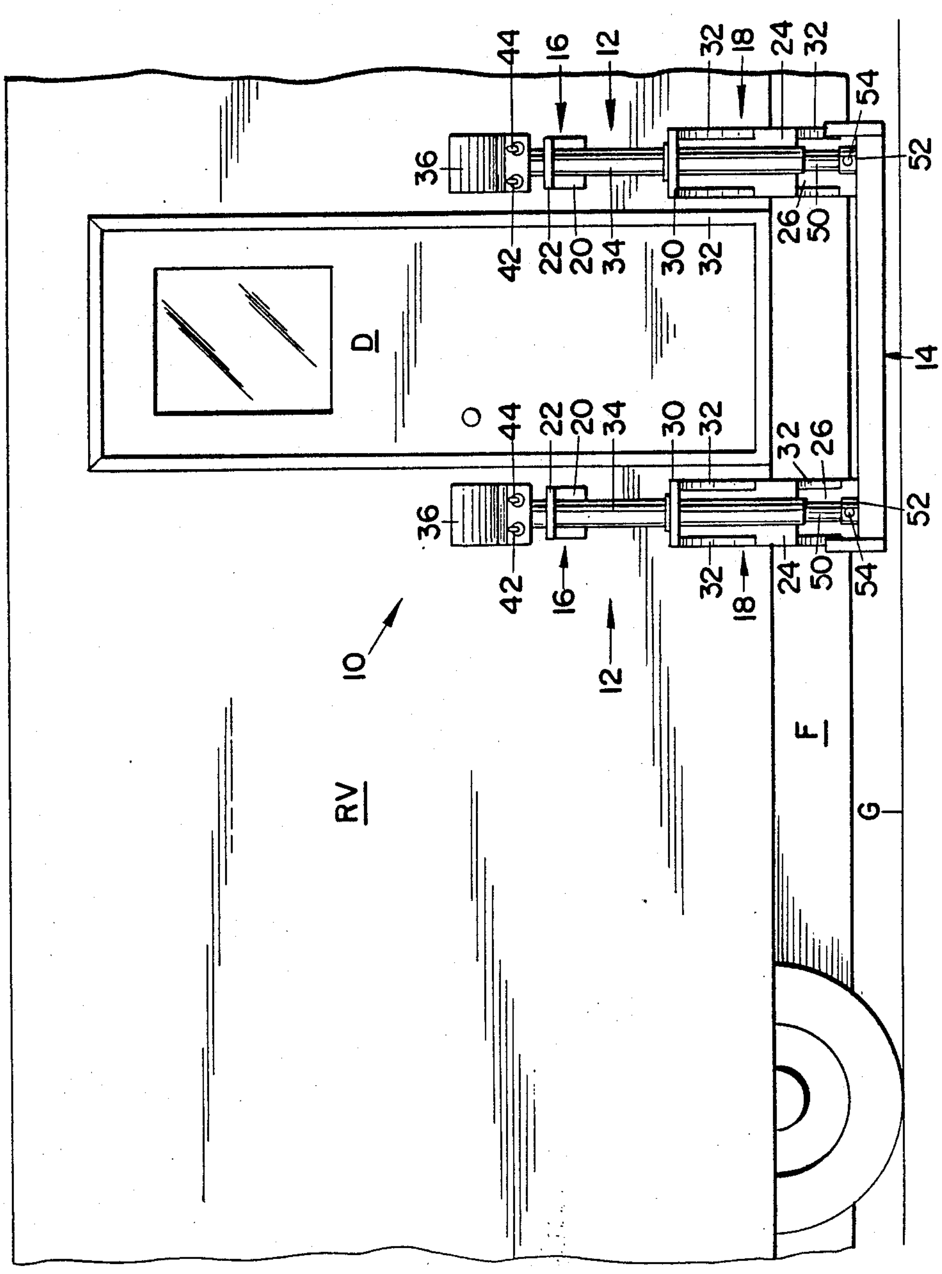
FIG. 1 is a fragmentary side elevational view of a trailer with the stair lift of the invention associated therewith.

With reference to FIG. 1, a stair lift 10 embodying one form of the invention is associated with the side wall of a wheeled recreational vehicle RV, such as a trailer or the like, adjacent a doorway D of the vehicle, the doorway being situated at a relatively high level above the ground or road G, making it difficult for the elderly or infirm to enter or exit the vehicle.

Stair lift 10 includes a pair of identical, spaced, parallel, vertically-disposed jack assemblies 12, one disposed at each side of doorway D and supporting a stair or step 14 extending horizontally between their lower ends below the doorway.

Each jack assembly 12 is supported in spaced relation to a side of the RV by upper and lower L-shaped brackets 16 and 18 respectively.

Each upper bracket 16 includes a vertically-disposed brace 20 fixed to the RV side wall and a horizontally-disposed brace 22 fixed to and extending outwardly from the upper end thereof.

Each lower bracket 18 includes a pair of spaced, parallel vertically-disposed upper and lower braces 24 and 26 respectively, a lower horizontal brace 28 which connects between the lower end of brace 24 and the upper end of brace 26, and an upper horizontal brace 30 which extends outwardly from the upper end of upper vertical brace 24.

Lower vertical brace 26 of each lower bracket 18 is fixed to a vehicle support frame member F which extends the length of the RV and is disposed inwardly of the RV side wall below door D.

Gussets 32 extend between each of the braces 24 and 30, 24 and 28, and 26 and 28 of each lower bracket 18 to strengthen the structure.

An outer cylindrical sleeve 34 of each jack assembly 12 passes vertically through and is rigidly held by the horizontal braces 22 and 30 of upper and lower brackets 16 and 18 respectively.

Outer cylindrical sleeve 34 of each jack assembly 12 is fixed at its upper end to the bottom wall of a housing 36 which contains a 12-volt motor 38, a light 40, a light switch 42 and a three-way power switch 44, with electric leads 46 connecting these components to each other and to the RV battery, not shown.

Motors 38 each incorporate an override clutch, not shown, to prevent the jacks from overextension, overretraction, or overload.

Each three-way switch 44 includes an off mode, or central position, an extension mode, or down position, and a retraction mode, or up position.

A vertically-disposed externally threaded ram 48 of each jack assembly 12 is linked at its upper end to motor 38 and is rotated by the motor.

Ram 48 of each jack assembly 12 is sleeved by an inner internally threaded cylindrical sleeve 50 telescopically sleeved by outer cylindrical sleeve 34.

The lower end of inner sleeve 50 of each jack assembly 12 is disposed in the open mouth of a cylindrical foot pad 52 fixed to and extending upwardly from the upper surface of stair or step 14 adjacent the opposite ends of the latter.

A locking pin 54 extends through provided openings, not shown, in each foot pad 52 and sleeve 50 to insure against separation of the two components.

Jack assemblies 12 operate in tandem upon activation of one of the power switches 44.

Activation of motors 38 by switch 44 effects rotation of each ram 48 relative to its inner sleeve 50 to raise or lower stair or step 14 as desired through a distance of approximately sixteen and one-half inches in approximately sixty-five seconds.

Each jack assembly 12 has a lifting capacity of 2500 pounds.

Thus, stair lift 10 can easily and safely support a person standing on stair or step 14 when the stair is raised or lowered relative to the ground or road G, to facilitate entry into or exit of the person from trailer doorway D.

While a one-part stair or step 14 is acceptable when the RV is to be permanently parked, it is not desirable when the vehicle is to be moved since it protrudes outwardly an unwanted distance from the side of the vehicle making it difficult to maneuver the vehicle in narrow or confined spaces.

Accordingly, a modified two-part folding stair or step 114 is provided and is illustrated in FIGS. 4–8.

Figure 4:
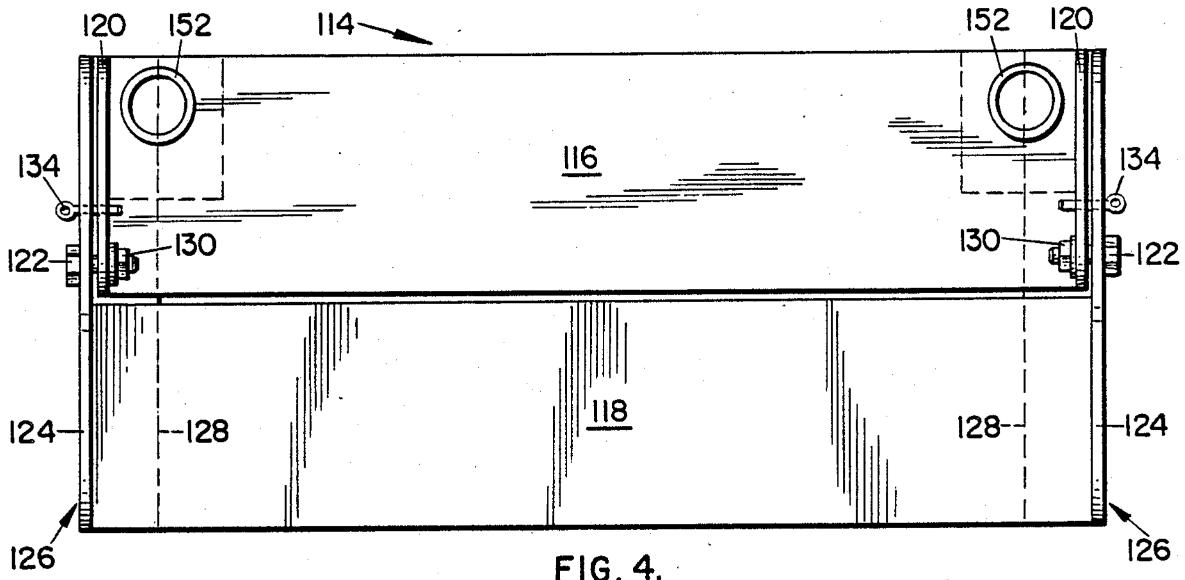
FIG. 4 is an enlarged top plan view of a modified, foldable form of stair.
Figure 5:
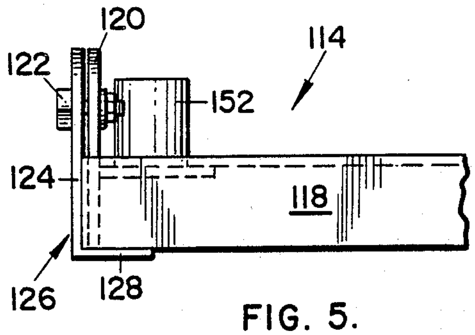
FIG. 5 is a fragmentary front elevational view of the stair of FIG. 4.
Figure 6:
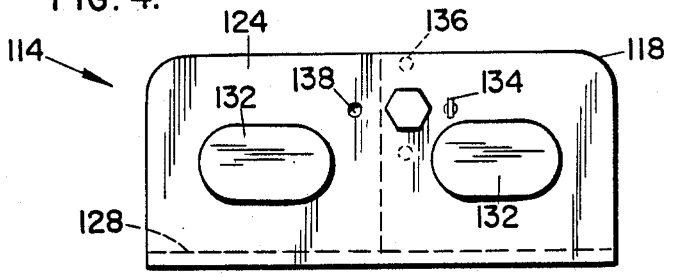
FIG. 6 is an end elevational view as seen from the right of FIG. 4.

In this embodiment, when the vehicle is parked the stair is placed in an unfolded or use position as shown in FIGS. 4, 5 and 6.

Figure 7:
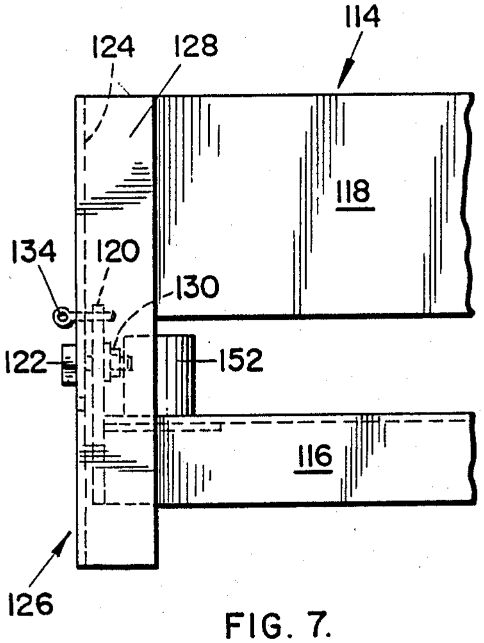
FIG. 7 is a fragmentary front elevational view of the stair of FIG. 4, with the front portion of the stair in a raised or folded position.
Figure 8:
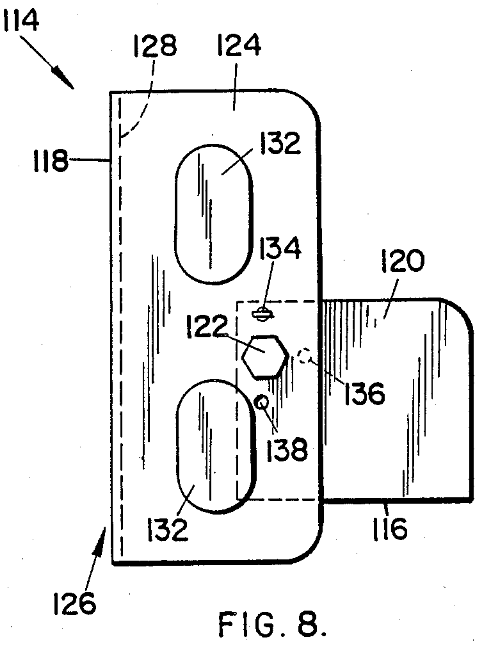
FIG. 8 is an end elevational view as seen from the right of FIG. 4, with the front portion of the stair in a raised or folded position.

When traveling, the stair is placed in a folded or non-use position as shown in FIGS. 7 and 8.

Stair 114 includes a fixed rear portion 116 and movable front portion 118.

Figure 2:
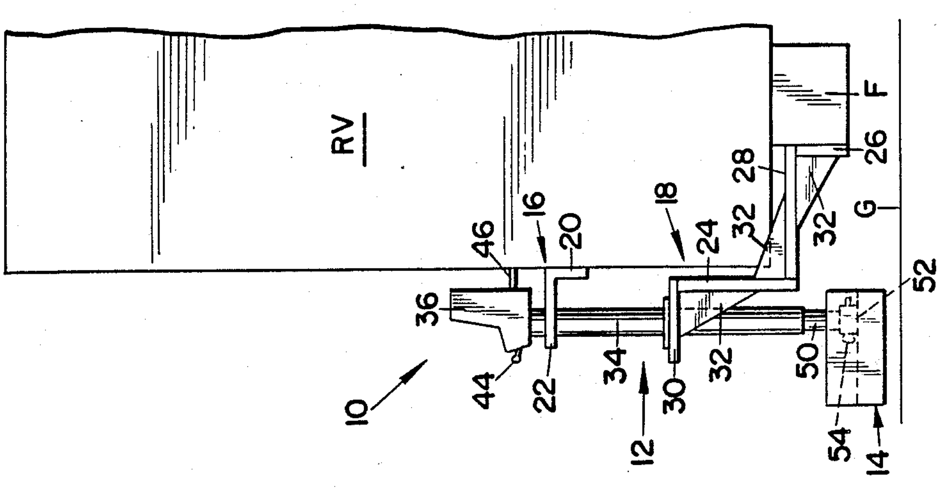
FIG. 2 is a fragmentary end elevational view as seen from the right of FIG. 1.
Figure 3:
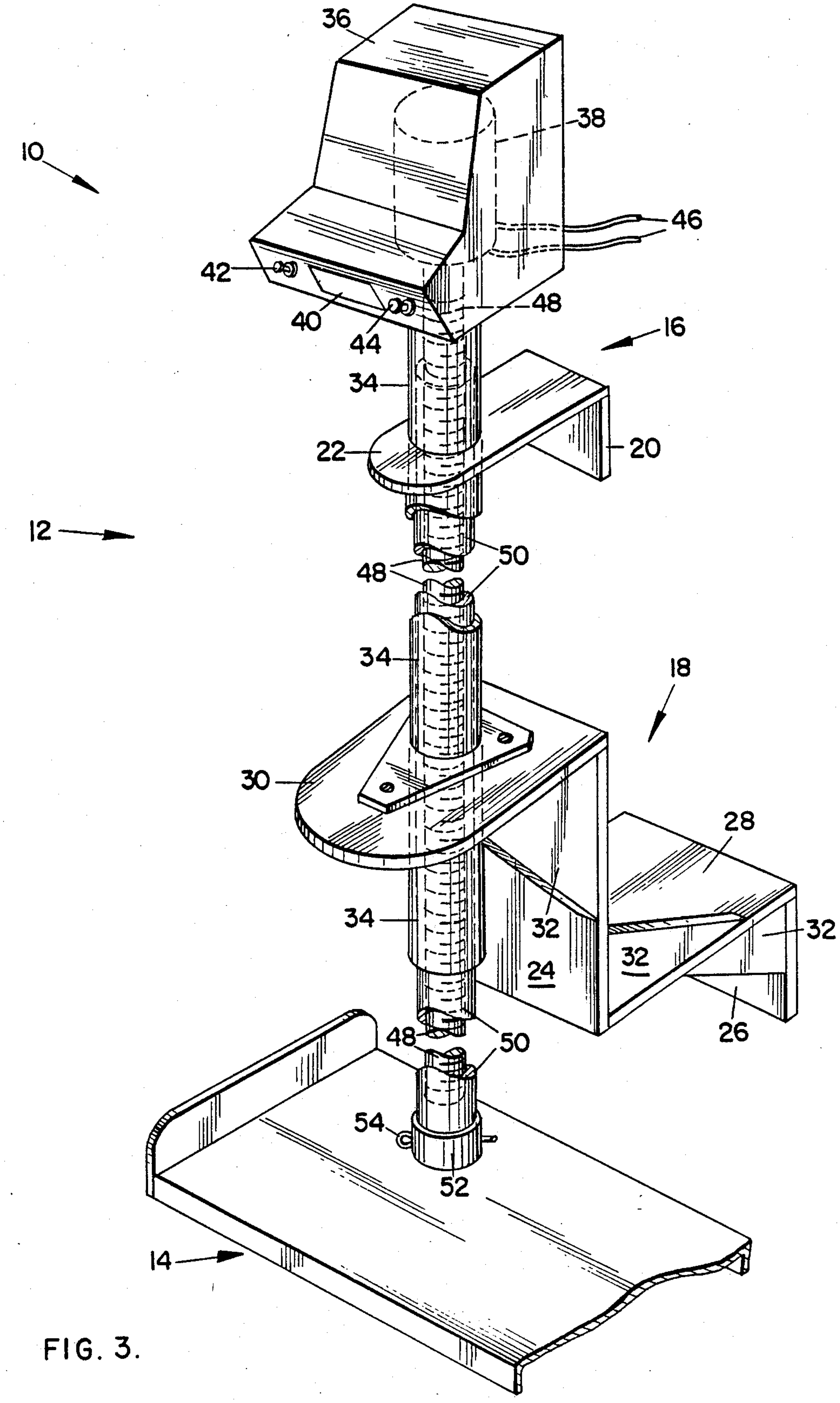
FIG. 3 is an enlarged, broken perspective view of one of the jack assemblies of the stair lift of the invention.

Rear portion 116 has a pair of cylindrical foot pads 152 fixed thereto adjacent its rearward edge and extending upwardly therefrom at each end thereof, with the lower ends of the inner cylindrical sleeves 50 of each jack assembly 12 being secured therein as with the one-part stair 14 of FIGS. 1-3.

A flange 120 extends vertically upwardly from each end of rear portion 116.

Movable front portion 118 is pivotally mounted to rear portion 116 by a pair of pivot bolts 122 for movement between a horizontal or use position wherein it is aligned with rear portion 116 and a vertical or non-use position wherein it is disposed normal or perpendicular to rear portion 116.

Pivot bolts 122 pass freely through aligned openings in flanges 120 of rear portion 116 and pair of upright transversely-extending flanges 124 of a pair of angle irons 126 fixed to front portion 118 at each end thereof.

Upright flanges 124 of angle irons 126 are spaced outwardly from flanges 120 of rear portion 116. An integral web 128 of each angle iron is fixed to the lower surface of front portion 118 and extends rearwardly from said front portion and underlies and supports rear portion 116 when the front portion is in a horizontal or use position.

Nuts 130 are threaded on the ends of pivot bolts 122 to retain the bolts in position.

Reflectors 132 are provided on the outer faces of upright flanges 124 so that stair or step 114 is readily visible at all times.

Of course, similar reflectors, not shown, may be provided on stair or step 14.

When it is desired to move front portion 118 of stair or step 114 to a non-use position, its front edge is moved upwardly causing the front portion to pivot relative to pivot bolts 122 and fixed rear portion 116 to an upright position as shown in FIGS. 7 and 8.

Locking pins 134 may be inserted in aligned openings 136 and 138 provided in flanges 120 and 124 respectively at each end of stair or step 114 to secure front portion 118 in either a raised or lowered position.

A longitudinally-extending brace, not shown, may be provided below the opening between the front edge of rear portion 116 and the rear edge of front portion 118 to further strengthen the stair structure.

We claim:

1. In combination with a battery-powered vehicle having a doorway and a vehicle support frame member which extends the length of the vehicle and is disposed inwardly of a vehicle side wall below the doorway and disposed a substantial distance above the ground, a stair lift comprising:

a pair of screw-type power jack assemblies vertically disposed one on each side of the doorway and rigidly secured to the vehicle, each power jack assembly including an outer cylindrical sleeve, an inner cylindrical sleeve, a motor and a power switch and being supported by upper and lower L-shaped brackets fixed to the vehicle on each side of the doorway, each upper bracket including a vertically-disposed brace fixed to the vehicle side wall and a horizontally-disposed brace fixed to and extending outwardly from its upper end, each lower bracket including a pair of spaced, parallel vertically-disposed upper and lower braces, a lower horizontal brace which connects between the lower end of the upper brace and the upper end of the lower brace, and an upper horizontal brace which extends outwardly from the upper end of the upper vertical brace, the lower vertical brace of each lower bracket being fixed to the vehicle support frame member, gussets extending between each of the braces of each lower bracket to strengthen the structure, the outer cylindrical sleeve of each jack assembly passing vertically through and being rigidly held by the horizontal braces of the upper and lower brackets, a stair extending horizontally between the jack assemblies and being suspended therefrom for supporting a person thereon, the stair comprising a horizontally-disposed rear portion fixed to the inner cylindrical sleeves of the power jack assemblies and a front portion pivoted to the rear portion and manually movable between a vertical position wherein it is angularly-disposed relative to the rear portion and a horizontal position wherein it is in horizontal alignment with the rear portion, locking means for locking the stair front portion in selected vertical or horizontal positions relative to the stair rear portion, means electrically connecting the motors and power switches to each other and to the vehicle battery for effecting tandem operation of the jack assemblies upon actuation of either power switch, and a ram in each inner cylindrical sleeve of each power jack assembly rotatable upon activation of the motors by either power switch for raising and lowering the stair and the person supported thereon relative to the ground.

* * * * *